United States Patent [19]

Nagamura et al.

[11] Patent Number: 5,682,761
[45] Date of Patent: Nov. 4, 1997

[54] ULTRA-HIGH PURITY NITROGEN GENERATING METHOD AND UNIT

[75] Inventors: Takashi Nagamura; Takao Yamamoto; Shinji Tomita, all of Hyogo-ken, Japan

[73] Assignee: Teisan Kabushiki Kaisha, Tokyo, Japan

[21] Appl. No.: 684,057

[22] Filed: Jul. 19, 1996

[30] Foreign Application Priority Data

Jul. 21, 1995 [JP] Japan .................................. 7-185933

[51] Int. Cl.$^6$ ......................................................... F25J 1/00
[52] U.S. Cl. ........................................... 62/643; 62/913
[58] Field of Search ............................. 62/643, 905, 913

[56] References Cited

U.S. PATENT DOCUMENTS 5,412,954  5/1995  Grenier ..................................... 62/646
5,461,871 10/1995  Bracque et al. ........................... 62/905

Primary Examiner—Ronald C. Capossela
Attorney, Agent, or Firm—Young & Thompson

[57] ABSTRACT

Ultra-high purity nitrogen is generated by removing, from feed air, carbon dioxide, moisture and catalyst poisons of an oxidation catalyst contained therein by a decarbonating drier (4). The feed air is then introduced into a low-pressure rectification column (6), where it is roughly rectified to further remove the carbon dioxide, moisture and catalyst poison. Then raw nitrogen gas obtained in the low-pressure rectification column (6) is introduced into an oxidation column (8) so that carbon monoxide in the raw nitrogen gas is converted to carbon dioxide and hydrogen also contained therein to water. Thereafter the raw nitrogen gas is introduced into an adsorption column (10) so that carbon dioxide and water are removed by adsorption to provide feed raw nitrogen gas, which is fed into an intermediate-pressure rectification column (11), where it is rectified. Nitrogen gas from the top portion of the intermediate-pressure rectification column is condensed by a reboiler-condenser (6RC) to provide high purity liquid nitrogen; and the liquid nitrogen is returned to the intermediate-pressure rectification column (11), whereby a part of this high purity liquid nitrogen is used as a reflux liquid and the remaining part thereof is taken out of a rectifying stage that is several stages below the rectifying stage in the top portion of the intermediate-pressure rectification column as an ultra-high purity nitrogen gas product or ultra-high purity liquid nitrogen product.

12 Claims, 3 Drawing Sheets

ULTRA-HIGH PURITY NITROGEN GENERATING METHOD AND UNIT

The present invention relates to an ultra-high purity nitrogen generating method and unit therefor, and especially to a method and unit for producing nitrogen gas or liquid nitrogen of ultra-high purity preferable for the manufacture of submicron LSI by using air as a food material and a rectification column.

As disclosed, for example, in the official gazette of Japanese Patent Laid-open No. 225,568/1986, there has been hitherto proposed a means comprising compressing feed air, passing the feed air which has got an elevated temperature by said compression through an oxidation column filled with an oxidation catalyst, where carbon monoxide (CO) and hydrogen ($H_2$) are oxidized to carbon dioxide ($CO_2$) and water ($H_2O$), respectively, and then cooling down the food air, removing the carbon dioxide and water by an adsorption column filled with an adsorbent, and then further cooling down and liquefying the food air by a heat exchanger, and introducing the liquefied air into a rectification column to produce a nitrogen product of high purity.

[Problems Sought for Solution by the Invention]

In the aforementioned prior art, feed air is compressed and the compressed air is directly introduced into an oxidation column. However, there is such a problem that since sulfides such as SOx and $H_2S$ exist in the feed air, these sulfides act as catalyst poisons and hence the activity of the oxidation catalyst is lowered. In the prior art, it has been therefore necessary to provide an installation for removing substances which become catalyst poisons before the oxidation-column, or to fill the catalyst in an amount more than that required due to consideration of the degradation of its activity.

Since the oxidation column is positioned upperstream of a cold box accomodating the rectification column, there has been not an effective means of removing carbon monoxide and hydrogen in liquid nitrogen which is directly introduced into the rectification column at the back-up time.

The present invention is intended to dissolve these problems.

[Means for Solution of the Problems]

An ultra-high purity nitrogen generating method according to the present invention comprises: a first step of removing, from feed air, carbon dioxide, moisture and catalyst poisons of an oxidation catalyst contained therein by means of a decarbonating drier; a second step of cooling down the feed air obtained by the first step, and introducing the cooled feed air to a low-pressure rectification column, where it is roughly rectified so as to be further freed of the carbon dioxide, moisture and catalyst poisons; a third step of warming raw nitrogen gas that is the nitrogen gas obtained by the second step and containing oxygen, and then compressing the warmed raw nitrogen gas; a fourth step of introducing the raw nitrogen gas obtained by the third step to an oxidation column, where carbon monoxide in the raw nitrogen gas is converted to carbon dioxide and hydrogen also contained therein to water, and then cooling down the raw nitrogen gas, and introducing the cooled raw nitrogen gas to an adsorption column, where the carbon dioxide and water in the raw nitrogen gas are removed by adsorption, thereby providing feed raw nitrogen gas; a fifth step of cooling down the feed raw nitrogen gas obtained in the fourth step, and introducing the cooled feed raw nitrogen gas to an intermediate-pressure rectification column, where it is rectified; a sixth step of expanding liquid nitrogen obtained from the bottom portion of said intermediate-pressure rectification column in the fifth step, and then introducing the expanded liquid nitrogen to said low-pressure rectification column as a feed material and cold; a seventh step of condensing nitrogen gas obtained in the fifth step by a reboiler-condenser to provide high purity liquid nitrogen, returning the high purity liquid nitrogen to said intermediate-pressure rectification column, and discharging non-condensed gas which has been not condensed in said reboiler-condenser from the lower portion of the reboiler-condenser; an eighth step of supplying cold necessary for the above-mentioned rectification to anyone of the equipments in a cold box; and a ninth step of using a part of the high purity liquid nitrogen returned from said reboiler-condenser to said intermediate-pressure rectification column as a reflux liquid and taking out the remaining part thereof from a rectifying stage that is several stages below the rectifying stage in the top portion of said intermediate-pressure rectification column as an ultra-high purity nitrogen gas product or ulta-high purity liquid nitrogen product.

Said cold used in the eighth step can be introduced from the outside of said cold box into said low-pressure rectification column.

When the rough rectification has been carried out in said low-pressure rectification column in the second step, oxygen-rich liquid air reservoired in the bottom portion of said low-pressure rectification column may be evaporated to provide waste gas, and after a part of this waste gas is heated, it may be adiabatically expanded so as to be used as said cold used in the eighth step.

When said feed raw nitrogen gas is cooled down and introduced into said intermediate-pressure rectification column in the fifth step, a part of said feed raw nitrogen gas may be taken out of the cooling way and adiabatically expanded so as to be used as said cold used in the eighth step. When the rough rectification has been carried out in said low-pressure rectification column in the second step, it is effective that oxygen-rich liquid air reservoired in the bottom portion of said low-pressure rectification column is evaporated to provide waste gas, and after at least a part of this waste gas is heated, it is used for the regeneration of said decarbonating drier.

Said reboiler-condenser is disposed in the inner lower portion of said low-pressure rectification column, and said oxygen-rich liquid air can be evaporated by the same reboiler-condenser to provide taste gas.

At the back-up time, liquid nitrogen for back-up use may be introduced from the outside of said cold box into said low-pressure rectification column.

An ultra-high purity nitrogen generating unit according to the present invention comprises: a decarbonating drier for removing, from feed air, carbon dioxide, moisture and catalyst poisons of an oxidation catalyst contained therein; a low-pressure rectification column for roughly rectifying the feed air passed through said decarbonating drier, thereby obtaining raw nitrogen gas that is the nitrogen gas further freed of the catalyst poisons of the oxidation catalyst and containing oxygen; a compressor for elevating the temperature and pressure of said raw nitrogen gas obtained in said low-pressure rectification column; an oxidation column for converting carbon monoxide in the raw nitrogen gas that has passed through said compressor to carbon dioxide and hydrogen also contained therein to water; an adsorption column for cooling down the carbon dioxide and water formed by said oxidation column and removing them by adsorption, thereby obtaining feed raw nitrogen gas; an intermediate-pressure rectification column for rectifying said feed raw nitrogen gas, thereby obtaining an ultra-high purity nitrogen gas product or ultra-high purify liquid nitrogen product from a rectifying stage that is several stages below the rectifying stage in the top portion of the same column; a means involving an expansion valve for expanding the liquid nitrogen obtained from the bottom portion of said intermediate-pressure rectification column and introducing the expanded liquid nitrogen to said low-pressure rectification column as a feed material and cold; a reboiler-condenser for condensing and liquefying the nitrogen gas obtained from said intermediate-pressure rectification column, and then turning the resulting liquid nitrogen back to the intermediate-pressure rectification column: a heat exchanger for heat-exchanging the feed air to be introduced to said low-pressure rectification column, the raw nitrogen gas taken out of the low-pressure rectification column, the feed raw nitrogen gas to be introduced to said intermediate-pressure rectification column and the ultra-high purity nitrogen gas product taken out of the intermediate-pressure rectification column with one another; a cold box surrounding said heat exchanger, said low-pressure rectification column, said intermediate-pressure rectification column and said reboiler-condenser; and a cold supply means for supplying cold necessary for the above-mentioned rectification to anyone of the equipments in said cold box.

Said cold supply means can be a means of introducing said cold from the outside of said cold box to said low-pressure rectification column.

Said cold supply means may involve an expansion turbine for adiabatically expanding waste gas obtained from the oxygen-rich liquid air reservoired in the bottom portion of said low-pressure rectification column and introducing the expanded waste gas to said heat exchanger as cold.

Further, said cold supply means may involve an expansion turbine for taking out a part of said feed raw nitrogen gas introduced in said intermediate-pressure rectification column from the way of said heat exchanger, adiabatically expanding the taken-out nitrogen gas, and introducing the expanded nitrogen gas to said heat exchanger as cold.

Furthermore, an ultra-high purity nitrogen generating unit according to the present invention preferably comprises: a means for introducing, at the back-up time, liquid nitrogen for back-up use from the outside of said cold box into said low-pressure rectification column.

[Embodiments of The Invention]

Now referring to the drawings, a preferred embodiment of the present invention will be described in detail. In the drawings, in addition, the same numeral is given to the same or corresponding portion.

In the present invention, as shown in the flow diagram of FIG. 1, feed air (1,000 Nm³/h) is introduced into an air filter 1 so as to be freed of dust, and this feed air freed of dust is introduced into a compressor 2 through a pipe P1 so as to be compressed to a pressure necessary for air separation, for example to 3.8 ata. After the compressed feed air is then passed through a Freon refrigerator 3 through a pipe P2 so as to be cooled down, it is fed to a decarbonating drier 4 through a pipe P3.

This decarbonating drier 4 comprises two molecular sieve columns which are alternately switched over for use, where the feed air will be fed to one of them so that carbon dioxide ($CO_2$) and moisture ($H_2O$) and sulfides such as SOx and $H_2S$ which become catalyst poisons of an oxidation catalyst, contained in the feed air, are removed by adsorption. To the other molecular sieve column, for this time, waste gas (impure oxygen gas) passed through a main heat exchanger 5 which will be hereinafter mentioned is fed as a regeneration gas for the decarbonating drier 4.

After the feed air which has been freed of carbon dioxide gas, moisture, sulfides and other impurities by the decarbonating drier 4 is fed to the main heat exchanger 5 through a pipe P4 so as to be cooled down nearly to its liquefying point, it fed to a feed air intake portion 6a in the middle portion of a low-pressure rectification column 6 by way of a pipe P5. To the upper portion of this low-pressure rectification column 6, liquid nitrogen which is cold is fed through a pipe P6. In the inner upper rectifying portion 6b of the low-pressure rectification column 6, the feed air ascending from the lower portion and liquid nitrogen (reflux liquid) descending from the inner upper portion of the low-pressure rectification column 6 are therefore brought into countercurrent contact with each other, whereby oxygen in the feed air is liquefied, SOx and $H_2S$ which become catalyst poisons are completely removed and low purity nitrogen gas containing the remaining oxygen component is separated by rectification. In the inner lower rectifying portion 6c of the low-pressure rectification column 6, the reflux liquid descending from the upper portion and reboil gas formed in the bottom portion are brought in countercurrent contact with each other, whereby nitroggen in the reflux liquid is evaporated, oxygen in the reboil gas is liquefied and the liquefied oxygen is led to a reboiler-condenser 6RC in the inner lower portion of the low-pressure rectification column 6 as oxygen-rich liquid air.

From the column top of the low-pressure rectification column-6, said low purity nitrogen gas (nitrogen gas containing an oxygen component, i.e. raw nitrogen gas) is taken out. This raw nitrogen gas is fed to the main heat exchanger 5 through a pipe P7 so as to be used as a cold source for the main heat exchanger 5. Raw nitrogen gas led out of the main heat exchanger 5 gets normal temperature and a pressure of 3.1 ata. This raw nitrogen gas is further introduced to a recycle compressor 7 by way of a pipe P8 so as to be compressed to a pressure of 9.3 ata, and then led to an oxidation column 8 filled with an oxidation catalyst through a pipe P9. In this oxidation column 8, carbon monoxide (CO) and hydrogen ($H_2$) remaining in the raw nitrogen gas are oxdized to carbon dioxide and water. Then, the raw nitrogen gas is cooled by a cooler 9 through a pipe P10, and led to an adsorption column 10 by way of a pipe P11. After carbon dioxide and moisture are removed by adsorption, the raw nitrogen gas is led as feed raw nitrogen gas to the main heat exchanger 5 through a pipe P12 so as to be cooled down nearly to its liquefying point. The thus-cooled nitrogen gas is then fed to a feed raw nitrogen intake portion 11a in the lower portion of an intermediate-pressure rectification column 11 through a pipe P13. When the feed raw nitrogen gas ascends through the rectifying portions 11b, 11d, in the intermediate-pressure rectification column 11, it is brought into contact with the descending reflux liquid so as to liquefy its oxygen component, and reservoired in the bottom portion of the intermediate-pressure rectification column 11 as oxygen-rich liquid air. On the other hand, the rectified nitrogen gas freed of oxygen component is taken out of the top portion of the intermediate-pressure rectification column 11 and led into the reboiler-condenser 6RC in the lower portion of the low-pressure rectification column 6 through a pipe P14. In the reboiler-condenser 6RC, the rectified nitrogen gas is liquefied, the thus-obtained liquid nitrogen is returned to a reservoir portion R1 in the upper portion of the intermediate-pressure rectification column 11 through a pipe P15, and impurities which have not been liquefied such as helium (He), hydrogen ($H_2$) and neon (Ne) are discharged from the lower portion of the reboilewr-condenser 6RC through a pipe P16.

Said liquid nitrogen returned to the reservoir portion R1 of the intermediate-pressure rectification column 11 is of high purity nitrogen least containing components other than nitrogen. In order to further remove components having boiling points lower than that of nitrogen, this liquid nitrogen is caused to flow down from the reservoir portion R1 through a rectifying portion 11$d$ consisting of plural rectifying stages. After the resulting ultra-high purity nitrogen gas is taken out of a take-out portion 11$c$ in the middle portion of the intermediate-pressure rectification column 11 through a pipe P17, it is led to the main heat exchanger 5 so as to get normal temperature. After this normal temperature nitrogen gas is freed of fine dust by means of a particle filler (dust filter) 12 provided on a pipe P18, it is taken out at a pressure of about 8.3 ata and at a flow rate of about 700 $Nm^3/h$ as a gas product. Further, from the reservoir portion R2 of the intermediate-pressure rectification column 11, an ultra-high purity liquid nitrogen product is taken out in a liquid state through a pipe P19.

The liquid nitrogen in which the oxygen component has been concentrated in the bottom portion of the intermediate-pressure rectification column 11 is passed through a pipe P20 and expanded to 3.3 ata by an expansion valve V1 provided on the pipe P20, and the expanded liquid nitrogen is fed to the upper portion of the low-pressure rectification column 6 as cold and feed nitrogen so as to be used as a reflux liquid and feed nitrogen to the low-pressure rectification column 6.

The oxygen-rich liquid air in the bottom portion of the low-pressure rectification column 6 is used as a cold source in the reboiler-condenser 6RC disposed in the bottom portion of the low-pressure rectification column 6 so as to be evaporated in itself. A part of this oxygen-rich gas is returned as reboil gas to the bottom portion of the low-pressure rectification column 6, and the remaining oxygen-rich gas is passed through a pipe P21 to recover cold as a cold source for the main heat exchanger 5. The oxygen-rich gas which has got normal temperature due to heat exchange in the main heat exchanger 5 is led to the other molecular sieve column of the decarbonating drier 4 through a pipe P22 so as to be used as a regeneration gas for the decarbonating drier 4, and then discharged as waste gas through a pipe P23.

In FIG. 1, a part 13 surrounded by a dotted line is a cold box. The main heat exchanger 5, low-pressure rectification column 6, intermediate-pressure rectification column 11, expansion valve V1 and pipes thereof are accomodated in the inside of said cold box 13. This cold box 13 is thermally insulated from the atmospheric air because it is a low-temperature portion.

In order to supplement the lacking cold, it is devised that liquid nitrogen is fed, in an amount as large as about 1/100 of the feed air fed to the compressor 2 through the pipe P1, from the outside into the low-pressure rectification column 6 by way of the pipe P6. After the liquid nitrogen which has been fed by way of the pipe P6, as mentioned above, is passed through the same route as the feed air and roughly rectified by the low-pressure rectification column 6, it is led to the oxidation column 8 and adsorption column 10, where impurities such as carbon monoxide and catalyst poisons are removed therefrom.

It is enabled to introduce, at the back-up time, liquid nitrogen for back-up use from this pipe P6 to the low-pressure rectification column 6. This liquid nitrogen for back-up use is roughly rectified as a feed gas in the low-pressure rectifcation column 6. After carbon monoxide and hydrogen in raw nitrogen gas obtained in the low-pressure rectification column 6 are converted to carbon dioxide and water in the oxidation column 8, respectively, they are removed by adsorption in the adsorption column 10. Thereafter, the same nitrogen gas is fed to the intermediate-pressure rectification column 11. Cold energy of the liquid nitrogen for back-up use is fed to the intermediate-pressure rectification column 11 by way of the reboiler-condenser 6RC. Accordingly, a nitrogen component and cold energy in the liquid nitrogen for back-up use can be recovered about 100% and ultra-high purity nitrogen can be produced even at the back-up time.

Although it is devised to feed the lacking cold from the outside in the aforementioned embodiment, such cold may be generated by use of an expansion turbine as in the second embodiment illustrated in FIG. 2. In the aforementioned first embodiment illustrated in FIG. 1, namely waste gas (oxygen-rich gas) taken out of the lower portion of the rectifying portion 6$c$ of the low-pressure rectification column 6 through the pipe P21 is directly introduced into the main heat exchanger 5. In the second embodiment illustrated in FIG. 2, however, a passage for the waste gas is divided to two passages before it gets into the main heat exchanger 5. A pipe P30 which is one branched passage has a shut-off valve V2 provided thereon, and a pipe P31 which is the other branched passage extends through the main heat exchanger 5 from its low-temperature side to the way between the low-temperature side and normal temperature side. Said pipe P31 has a shut-off valve V3 and expansion turbine 15 provided thereon outside of the main heat exchanger 5. Cold generated in the expansion turbine 15 is joined to the pipe P30 by way of a pipe P32, and introduced into the main heat exchanger 5 so as to be used as a cold source therefor.

In this second embodiment, the amount of cold is increased or decreased by adjusting the open degree of the shut-off valves $V_2$, $V_3$ to regulate the flow rate of gas passing through the expansion turbine 15, with no supply of cold from the outside. Since the amount of cold can be therefore made to correspond to the amounts of liquid nitrogen and nitrogen gas to be taken out as products, it is possible to stabilize the operation of the whole of the unit.

Furthermore, FIG. 3 shows a third embodiment of the present invention. In the first embodiment illustrated in FIG. 1, the feed raw nitrogen gas which has been freed of carbon dioxide and moisture by adsorption is introduced into the main heat exchanger 5 through the pipe P12. In this third embodiment illustrated in FIG. 3, however, it is devised that after a part of feed raw nitrogen gas is taken out of the way between the low temperature side and normal temperature side of the main heat exchanger 5 through a pipe P33 and adiabatically expanded by the expansion turbine 15, it is joined, by a pipe P34, with raw nitrogen gas for recycle use taken out of the top portion of the low-pressure rectification column 6 through the pipe P7 and then introduced into the main heat exchanger 5.

A shut-off valve V4 and the expansion turbine 15 are inserted in series in the pipe P33, a pipe P35 is connected in parallel to both the ends of this series connection of said shut-off valve V4 and expansion turbine 15, and a shut-off valve V5 is provided in this pipe P35. By adjusting the open degree of the shut-off valves V4, V5 to regulate the flow rate of gas passing through the expansion turbine 15, the amount of cold generated in the expansion turbine 15 is increased or decreased so as to be usable as a cold source necessary for driving the unit.

Although the reboiler-condenser 6RC is made in one body with the low-pressure rectification column 6 in the aforementioned embodiment, it may be provided separately from the low-pressure rectification column 6.

[Effects of the Invention]

According to the present invention, as mentioned above, the catalyst activity can be semi-permanently maintained because feed air is passed through the oxidation column after catalyst poisons such as SOx and $H_2S$ are removed through the normal temperature purification and the low temperature liquefying rectification in the low-pressure rectification column. Futher, ultra-high purity nitrogen can be recovered at a higher yield because low purity nitrogen separated by the low temperature liquefying rectification is recycled.

Since liquid nitrogen fed at the back-up time is fed to the low-pressure rectification clomun so as to be subjected to low temperature liquefying rectification and then passed through the oxidation column and adsorption column, it is possible to reliably remove catalyst poisons such as SOx and $H_2S$, carbon monoxide and hydrogen, without providing any special impurity removing facilities. Furthermore, since it is constructed that cold energy of liquid nitrogen for back-up use is recovered 100%, it is possible to produce ultra-hgh purity nitrogen at a higher yield even at the back-up time.

[DESCRIPTION OF REFERENCE NUMERALS]

Figure 1:
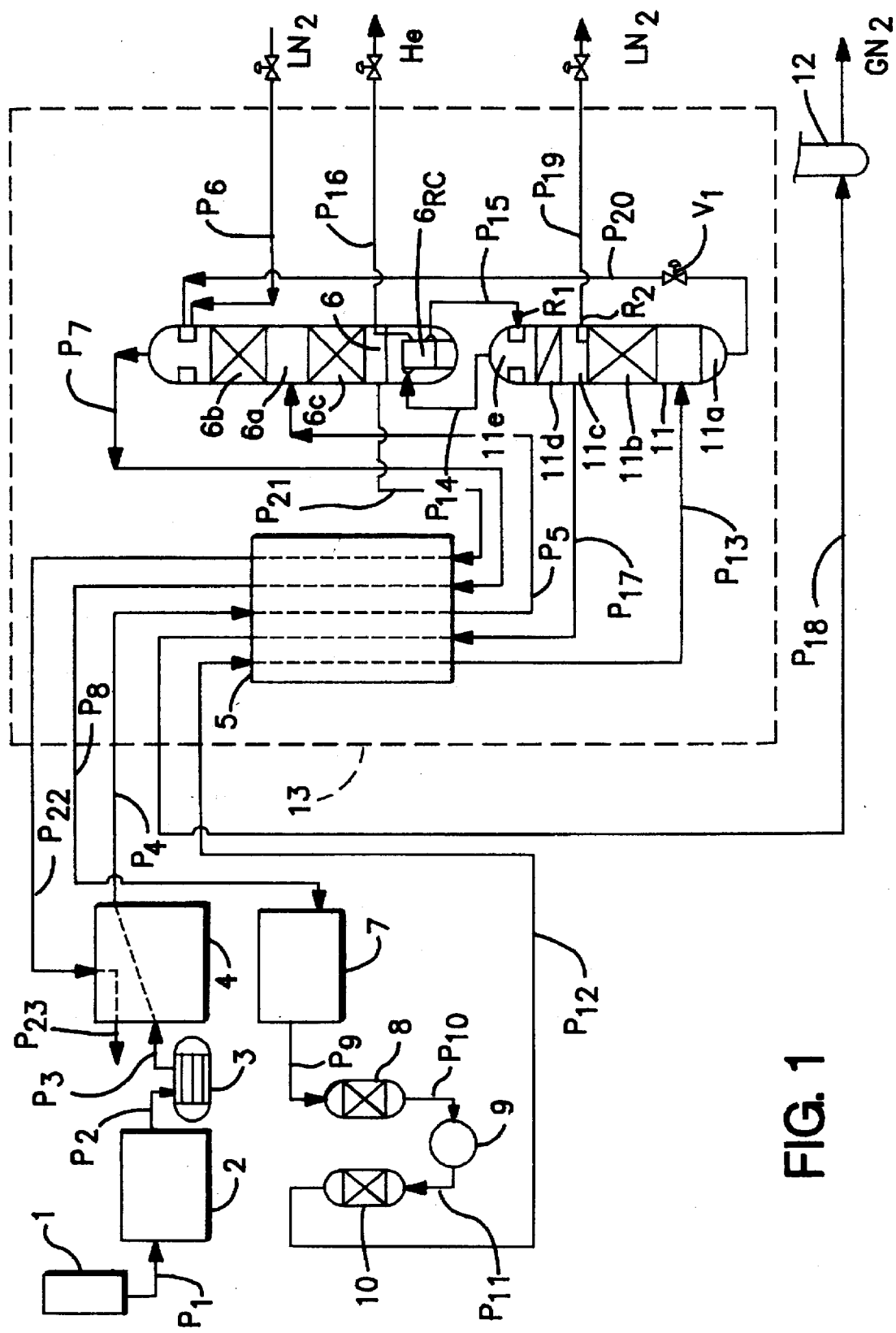
FIG. 1 is a flow diagram showing a first embodiment of an ultra-high purity nitrogen generating method and unit according to the present invention.
Figure 2:
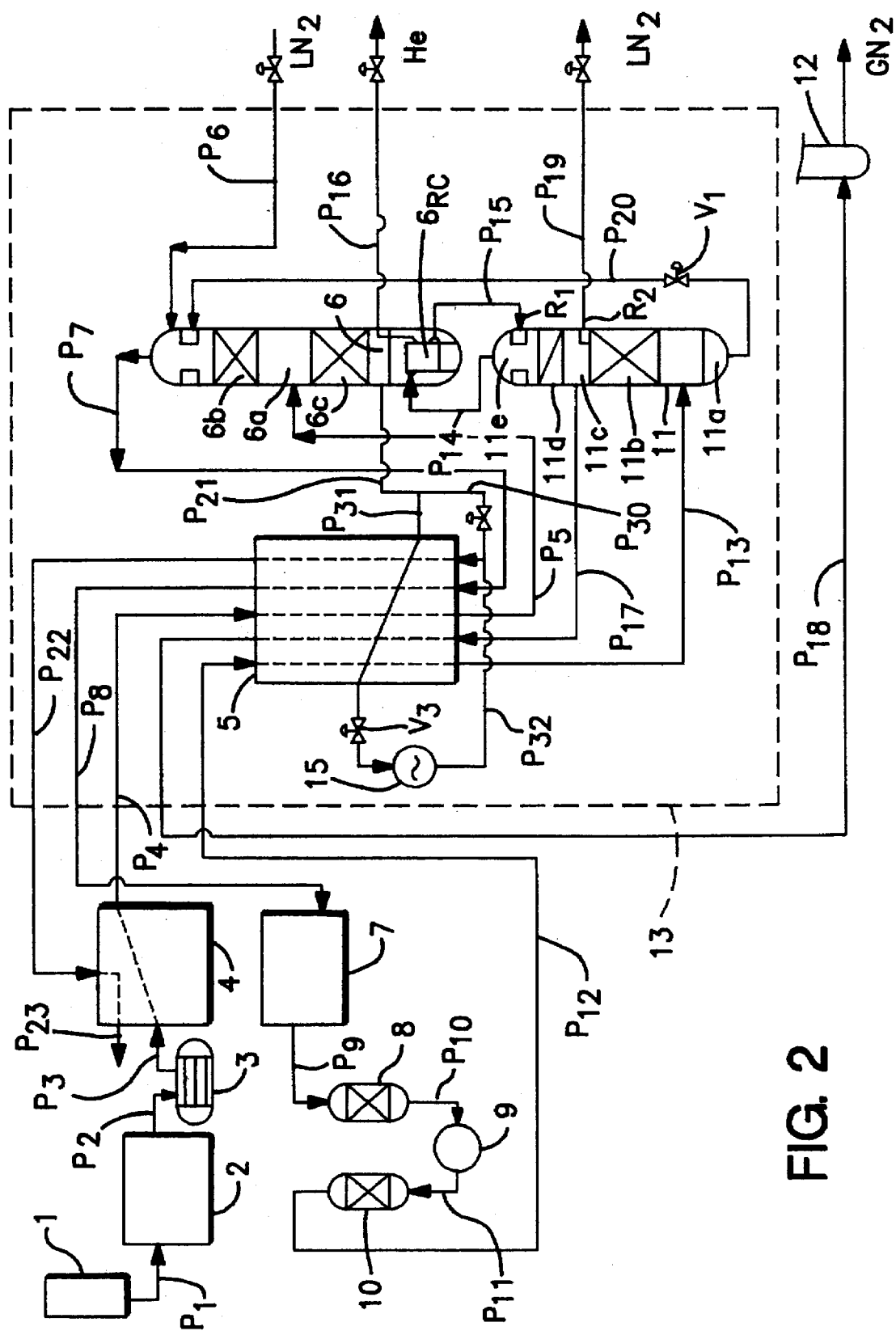
FIG. 2 is a flow diagram showing a second embodiment of an ultra-high purity nitrogen generating method and unit according to the present invention.
Figure 3:
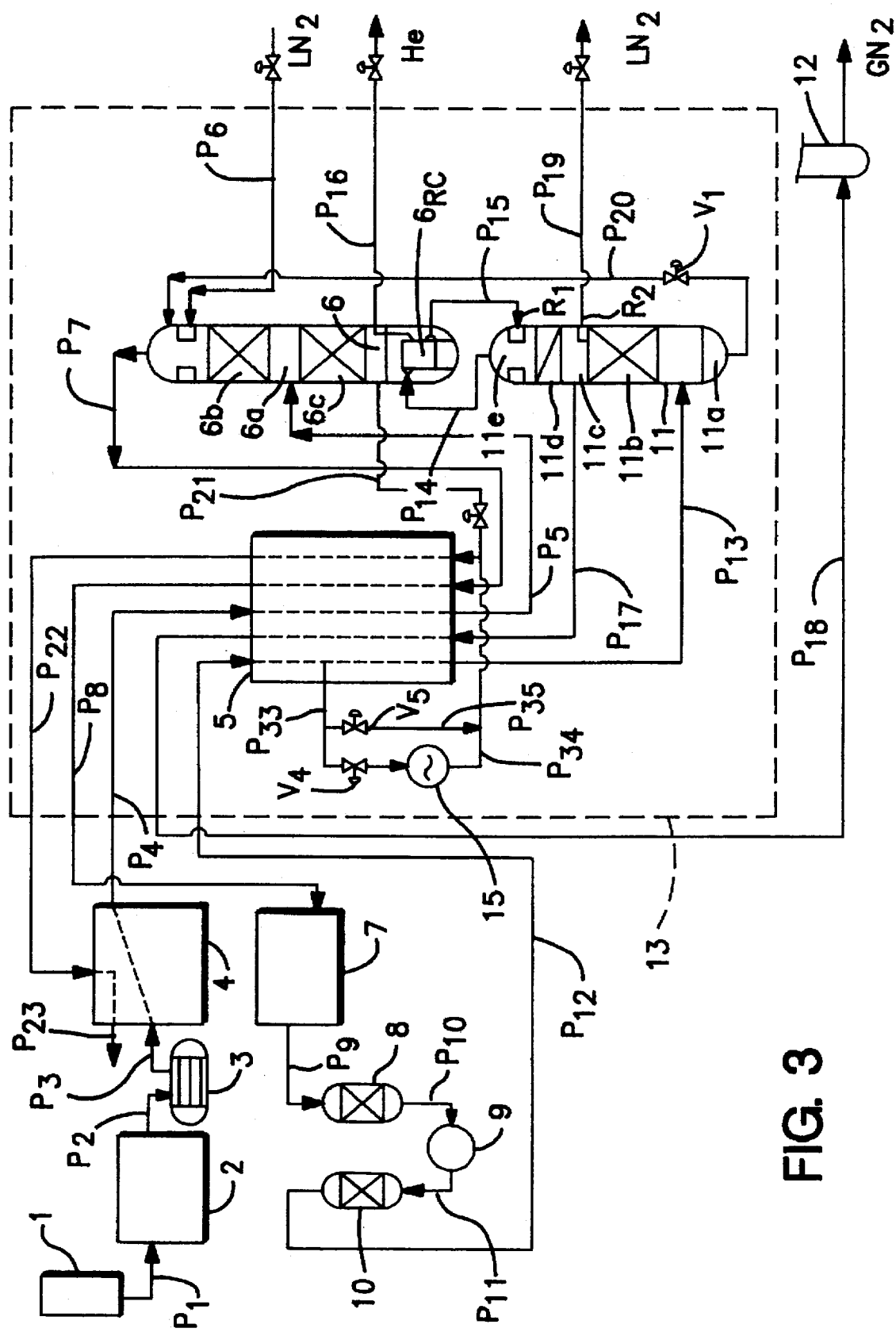
FIG. 3 is a flow diagram showing a third embodiment of an ultra-high purity nitrogen generating method and unit according to the present invention.

1—air filter, 2—compressor, 3—Freon refrigerator, 4—decarbonating drier, 5—main heat exchanger, 6—low-pressure rectification column, 6RC—reboiler-condenser, 7—recycle compressor, 8—oxidation column, 9—cooler, 10—adsorption column, 11—intermediate-pressure rectification column, 12—particle filter, 13—cold box, and 15—expansion turbine.

We claim:

1. An ultra-high purity nitrogen generating method which comprises:

a first step of removing, from feed air, carbon dioxide, moisture and catalyst poisons of an oxidation catalyst contained therein by means of a decarbonating drier;

a second step of cooling down the feed air obtained by the first step, and introducing the cooled feed air to a low-pressure rectification column, where it is roughly rectified so as to be further freed of the carbon dioxide, moisture and catalyst poisons;

a third step of warming raw nitrogen gas that is the nitrogen gas obtained by the second step and containing oxygen, and then compressing the warmed raw nitrogen gas;

a fourth step of introducing the raw nitrogen gas obtained by the third step to an oxidation column, where carbon monoxide in the raw nitrogen gas is converted to carbon dioxide and hydrogen also contained therein to water, and then cooling down the raw nitrogen gas, and introducing the cooled raw nitrogen to an adsorption column, where the carbon dioxide and water in the raw nitrogen gas are removed by adsorption, thereby providing feed raw nitrogen gas;

a fifth step of cooling down the feed raw nitrogen gas obtained in the fourth step, and introducing the cooled feed raw nitrogen gas to an intermediate-pressure rectification column, where it is rectified;

a sixth step of expanding liquid nitrogen obtained from the bottom portion of said intermediate-pressure rectification column in the fifth step, and then introducing the expanded liquid nitrogen to said low-pressure rectification column as a feed material and cold;

a seventh step of condensing nitrogen gas obtained in the fifth step by a reboiler-condenser to provide high purity liquid nitrogen, returning the high purity liquid nitrogen to said intermediate-pressure rectification column, and discharging non-condensed gas which has been not condensed in said reboiler-condenser from the lower portion of the reboiler-condenser;

an eighth step of supplying cold necessary for the above-mentioned rectification; and a ninth step of using a part of the high purity liquid nitrogen returned from said reboiler-condenser to said intermediate-pressure rectification column as a reflux liquid and taking out the remaining part thereof from a rectifying stage that is several stages below the rectifying stage in the top portion of said intermediate-pressure rectification column as an ultra-high purity nitrogen gas product or ultra-high purity liquid nitrogen product.

2. An ultra-high purity nitrogen generating method, according to claim 1, in which said cold used in the eighth step is introduced from the outside of said cold box into said low-pressure rectification column.

3. An ultra-high purity nitrogen generating method, according to claim 1, in which when the rough rectification has been carried out in said low-pressure rectification column in the second step, oxygen-rich liquid air reservoired in the bottom portion of said low-pressure rectification column is evaporated to provide waste gas, and after at least a part of this waste gas is heated, it is used for the regeneration of said decarbonating drier.

4. An ultra-high purity nitrogen generating method, according to claim 1, in which when the rough rectification has been carried out in said low-pressure rectification column in the second step, oxygen-rich liquid air reservoired in the bottom portion of said low-pressure rectification column is evaporated to provide waste gas, and after a part of this waste gas is heated, it is adiabatically expanded so as to be used as said cold used in the eighth step.

5. An ultra-high purity nitrogen generating method, according to claim 1, in which said reboiler-condenser is disposed in the inner lower portion of said low-pressure rectification column, and said oxygen-rich liquid air is evaporated by the same reboiler-condenser to provide waste gas.

6. An ultra-high purity nitrogen generating method, according to claim 1, in which when said feed raw nitrogen gas is cooled down and introduced into said intermediate-pressure rectification column in the fifth step, a part of said feed raw nitrogen gas is taken out of the cooling way and adiabatically expanded so as to be used as said cold used in the eighth step.

7. An ultra-high-purity nitrogen generating method, according to claim 1, in which at the back-up time, liquid nitrogen for back-up use is introduced from the outside of said cold box into said low-pressure rectification column.

8. An ultra-high purity nitrogen generating unit which comprises:

a decarbonating drier for removing, from feed air, carbon dioxide, moisture and catalyst poisons of an oxidation catalyst contained therein;

a low-pressure rectification column for roughly rectifying the feed air passed through said decarbonating drier, thereby obtaining raw nitrogen gas that is the nitrogen gas further freed of the catalyst poisons of the oxidation catalyst and containing oxygen;

a compressor for elevating the temperature and pressure of said raw nitrogen gas obtained in said low-pressure rectification column;

an oxidation column for converting carbon monoxide in the raw nitrogen gas that has passed through said compressor to carbon dioxide and hydrogen also contained therein to water;

an adsorption column for cooling down the carbon dioxide and water formed by said oxidation column and removing them by adsorption, thereby obtaining feed raw nitrogen gas;

an intermediate-pressure rectification column for rectifying said feed raw nitrogen gas, thereby obtaining an ultra-high purity nitrogen gas product or ultra-high purity liquid nitrogen product from a rectifying stage that is several stages below the rectifying stage in the top portion of the same column;

a means involving an expansion valve for expanding the liquid nitrogen obtained from the bottom portion of said intermediate-pressure rectification column and introducing the expanded liquid nitrogen to said low-pressure rectification column as a feed material and cold;

a reboiler-condenser for condensing and liquefying the nitrogen gas obtained from said intermediate-pressure rectification column, and then turning the resulting liquid nitrogen back to the intermediate-pressure rectification column;

a heat exchanger for heat-exchanging the feed air to be introduced to said low-pressure rectification column, the raw nitrogen gas taken out of the low-pressure rectification column, the feed raw nitrogen gas to be introduced to said intermediate-pressure rectification column and the ultra-high purity nitrogen gas product taken out of the intermediate-pressure rectification column with one another;

a cold box surrounding said heat exchanger, said low-pressure rectification column, said intermediate-pressure rectification column and said reboiler-condenser; and a cold supply means for supplying cold necessary for the above-mentioned rectification.

9. An ultra-high purity nitrogen generating unit, according to claim 8, in which said cold supply means is a means of introducing said cold from the outside of said cold box to said low-pressure rectification column.

10. An ultra-high purity nitrogen generating unit, according to claim 8, in which said cold supply means involves an expansion turbine for adiabatically expanding waste gas obtained from the oxygen-rich liquid air reservoired in the bottoom portion of said low-pressure rectification column and introducing the expanded waste gas to said heat exchanger as cold.

11. An ultra-high purity nitrogen generating unit, according to claim 8, in which said cold supply means involves an expansion turbine for taking out a part of said feed raw nitrogen gas introduced in said intermediate-pressure rectification column from the way of said heat exchanger, adiabatically expanding the taken-out nitrogen gas, and introducing the expanded nitrogen gas to said heat exchanger as cold.

12. An ultra-high purity nitrogen generating unit, according to claim 8, which further comprises: a means for introducing, at the back-up time, liquid nitrogen for back-up use from the outside of said cold box into said low-pressure rectification column.

* * * * *